(12) United States Patent
Bornemann et al.

(10) Patent No.: US 11,409,538 B2
(45) Date of Patent: Aug. 9, 2022

(54) DATA PROCESSING SYSTEM AND METHOD FOR CONFIGURING AND OPERATING A DATA PROCESSING SYSTEM

(71) Applicant: APTIV TECHNOLOGIES LIMITED, St. Michael (BB)

(72) Inventors: Martin Bornemann, Nuremberg (DE); Lee Bauer, Birmingham, MI (US); Sven Kopetzki, Lehrte (DE); Olaf Donner, Harsum (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 17/142,332

(22) Filed: Jan. 6, 2021

(65) Prior Publication Data

US 2021/0208899 A1 Jul. 8, 2021

Related U.S. Application Data

(60) Provisional application No. 62/957,970, filed on Jan. 7, 2020.

(51) Int. Cl.
*G06F 9/4401* (2018.01)
*G06F 13/28* (2006.01)
(Continued)

(52) U.S. Cl.
CPC ........ *G06F 9/4401* (2013.01); *G06F 11/0796* (2013.01); *G06F 11/2002* (2013.01);
(Continued)

(58) Field of Classification Search
CPC .... G06F 9/4401; G06F 13/28; G06F 13/4221; G06F 11/0751; G06F 11/2002; G06F 11/0796; G07C 5/08; B60R 16/0231
See application file for complete search history.

(56) References Cited

U.S. PATENT DOCUMENTS

2013/0090790 A1* 4/2013 Yuen ...................... G07C 5/008
701/22
2018/0120200 A1* 5/2018 Bechhoefer ........... G01M 13/00
(Continued)

FOREIGN PATENT DOCUMENTS

DE  10 2017 204691 B3  6/2018
DE  10 2018 211702 A1  7/2019

OTHER PUBLICATIONS

Extended European Search Report for Application No. EP 20 21 7480.1 dated May 31, 2021.

*Primary Examiner* — Glenn A. Auve
(74) *Attorney, Agent, or Firm* — Carlson, Gaskey & Olds, P.C.

(57) ABSTRACT

A data processing system includes a sensor data acquisition circuit configured to acquire sensor data from at least one sensor and a server circuit configured to receive the sensor data from the sensor data acquisition circuit and to forward the sensor data to a processing unit. The sensor data transmission path from the sensor data acquisition circuit to the server circuits might be setup as a static configuration. Any physical connection issue between the sensor data acquisition circuits and the server circuits would force the system to pre-defined data routing configurations.

13 Claims, 4 Drawing Sheets

(51) Int. Cl.
*G06F 13/42* (2006.01)
*G06F 11/07* (2006.01)
*G06F 11/20* (2006.01)
*G07C 5/08* (2006.01)

(52) U.S. Cl.
CPC .......... *G06F 13/28* (2013.01); *G06F 13/4221* (2013.01); *G07C 5/08* (2013.01)

(56) References Cited

U.S. PATENT DOCUMENTS

| | | |
|---|---|---|
| 2019/0258251 A1 | 8/2019 | Ditty et al. |
| 2020/0027008 A1* | 1/2020 | Nolan ................ H04L 67/12 |
| 2020/0209405 A1* | 7/2020 | Zhang ................ H04L 12/403 |
| 2021/0014323 A1* | 1/2021 | Hayes ................ G06F 16/2272 |
| 2021/0024096 A1* | 1/2021 | Wang ................ G06K 9/00798 |
| 2021/0354719 A1* | 11/2021 | Wang ................ B60W 60/001 |

* cited by examiner

| 31 | | 16 | 15 | | 0 | |
|---|---|---|---|---|---|---|
| Device ID | | | Vendor ID | | | 00h |
| Status | | | Command | | | 04h |
| Class Code | | | | | Revision ID | 08h |
| BIST | Header Type | | Lat. Timer | | Cache Line S. | 0Ch |
| Base Address Registers | | | | | | 10h |
| | | | | | | 14h |
| | | | | | | 18h |
| | | | | | | 1Ch |
| | | | | | | 20h |
| | | | | | | 24h |
| Cardbus CIS Pointer | | | | | | 28h |
| Subsystem ID | | | Subsystem Vendor ID | | | 2Ch |
| Expansion ROM Base Address | | | | | | 30h |
| Reserved | | | | | Cap. Pointer | 34h |
| Reserved | | | | | | 38h |
| Max Lat. | Min Gnt. | | Interrupt Pin | | Interrupt Line | 3Ch |

Fig. 4

DATA PROCESSING SYSTEM AND METHOD FOR CONFIGURING AND OPERATING A DATA PROCESSING SYSTEM

CROSS REFERENCE TO RELATED APPLICATION

This application claims priority to U.S. Provisional Application No. 62/957,970, which was filed on Jan. 7, 2020.

FIELD

The present disclosure relates to data processing systems and methods for configuring and operating a data processing system, in particular for applications in automotive systems.

BACKGROUND

In automotive applications, data transfer must be reliable and, in particular during a startup phase of the data transfer systems, fast. Use of well-defined communication protocols of conventional data transfer architectures may help reduce cost. Conventional data transfer architectures, however, usually involve a lengthy startup procedure.

Accordingly, there is a need to enhance conventional data transfer architectures, in particular, to increase reliability and improve start up time.

SUMMARY

In one aspect, the present disclosure is directed at a data processing system comprising: a sensor data acquisition circuit configured to acquire sensor data from at least one sensor; a server circuit configured to receive the sensor data from the sensor data acquisition circuit and to forward the sensor data (optionally after processing or re-arranging or reformatting) to a processing unit (for example a central processing unit (CPU) of an automotive system); a first memory (which may also be referred to as sensor data acquisition circuit memory) configured to store configuration data for the sensor data acquisition circuit; and a second memory (which may also be referred to as server circuit memory) configured to store configuration data for the server circuit.

In other words, the data processing system includes a sensor data acquisition circuit (or short: data acquisition circuit) and a server circuit, which may be configured according to configuration information stored in a memory associated with (for example provided in) the data acquisition circuit and the server circuit, respectively. The data acquisition circuit may be configured according to the configuration information stored in the memory associated with the data acquisition circuit. The server circuit may be configured according to the configuration information stored in the memory associated with the server circuit. A configuration circuit may be provided, and the configuration circuit may be configured to configure the sensor data acquisition circuit according to the first memory (for example according to the configuration information stored in the first memory) and to configure the server circuit according to the second memory (for example according to the configuration information stored in the second memory).

The sensor data transmission path from the sensor data acquisition circuit to the server circuits may be setup as a static configuration. Any physical connection issue between the sensor data acquisition circuits and the server circuits may force the system to pre-defined data routing configurations. The respective memories may be used for storing information about the static configuration and/or the pre-defined data routing configurations, and this information may be used for configuring the sensor data acquisition circuit and the server circuit.

The respective memories may be used for recalling startup configuration. Multiple static configurations may be provided, for example one configuration for normal operation (i.e. operation without any detected failure), and one or more further configurations may be provided which may be used in case failure is detected. The respective memories may be non-volatile memories.

The first memory and the second memory may be provided as a combined memory unit, for example non-volatile memory (for example Flash) or volatile memory (for example random access memory, RAM). The first memory may be associated with the sensor data acquisition circuit. For example, the first memory may be provided in the sensor data acquisition circuit. The second memory may be associated with the server circuit. For example, the second memory may be provided in the server circuit. Alternatively, the first memory and/or the second memory may be provided separate from the sensor data acquisition circuit and/or the server circuit.

Upon a first time of starting the data processing system, the data processing system may be configured according to self-enumeration (for example automated configuration of the PCIe components), for example as provided by PCI (Peripheral Component Interconnect) Express, and this configuration may be stored in the respective memories. Alternatively, the configuration data may be written into the respective memories from an external source before first time starting the data processing system. As such, multiple static enumeration on automotive PCI Express may be provided.

The sensor data acquisition circuit may be connected to the server circuit via cables and plugs, for example according to PCI Express. Alternatively, the sensor data acquisition circuit and the server circuit may be hardwired (for example soldered).

The data processing system may be provided according to a PCI Express standard, and may be provided a smart vehicle architecture.

It will be understood that circuit (for example in "sensor data acquisition circuit" or "server circuit") may refer to a circuit or circuitry, for example a system on a chip, or an arrangement of several chips.

According to another aspect, the sensor data acquisition circuit comprises a PCI Express End Point (EP), wherein the at least one sensor is connected to the PCI Express End Point. According to another aspect, the sensor data acquisition circuit comprises a plurality of PCI Express End Points, wherein a respective sensor is connected to each of the plurality of PCI Express End Points. There may be a separate EP for each sensor. Thus, the sensor data acquisition circuit may provide a PCI Switch functionality for connecting the one or more sensors via the EP to the RC (Root Complex) provided in the server circuit.

According to another aspect, the data processing system further comprises a further sensor data acquisition circuit connected to the sensor data acquisition circuit; wherein the further sensor data acquisition circuit is configured to acquire further sensor data from at least one further sensor; wherein the server circuit is configured to receive the further sensor data from the further sensor data acquisition circuit via the sensor data acquisition circuit. The sensor data acquisition circuit and the further sensor data acquisition circuit may be connected to the same RC in the server circuit, and thus may provide functionality to forward (or route through) the sensor data to the server circuit. More than two sensor data acquisition circuits may be provided.

According to another aspect, the server circuit comprises a PCI Express Root Complex (RC).

According to another aspect, the data processing system further comprises a further server circuit configured to receive the sensor data from the sensor data acquisition circuit (and to forward the sensor data to a processing unit). Providing a server circuit and a further server circuit provides enhanced failure tolerance. Even if communication between the sensor data acquisition and one of the server circuit and the further server circuit is interrupted (or if there is a failure in one of the server circuit and the further server circuit), the sensor data may still be forward to the processing unit via the other server circuit (i.e. via the server circuit in case of failure of the further server circuit, and via the further server circuit in case of failure of the server circuit).

According to another aspect, the server circuit and/or the further server circuit is configured according to a PCI Express Non-Transparent (NT) switch function. Using the PCIe NT switch function may allow multicast from the sensor data acquisition circuit to the server circuit and the further server circuit.

According to another aspect, the data processing system further comprises a failure detection circuit configured to detect a failure in operation of the data processing system; wherein the sensor data acquisition circuit and the server circuit are configured to set a default configuration if a failure is detected (by the failure detection circuit). For example, if sensor data is not received during a pre-determined period of time from the sensor connected to the sensor data acquisition circuit, it may be determined that a failure in the communication between the sensor data acquisition circuit and the server circuit has occurred.

According to another aspect, the data processing system further comprises a controller comprising an interface to the sensor data acquisition circuit and to the server circuit (and optionally to any further component of the data processing system). This interface may be used for (re-)configuring the data acquisition circuit and/or the server circuit (or triggering such a re-configuration), for example based on alternative configurations stored in the respective memories of the data acquisition circuit and/or the server circuit, for example in case of a (partial) system failure of the data processing system, for example a failure of PCIe connections between the components of the data processing system (for example between the sensor data acquisition circuit and the server circuit).

According to another aspect, the interface may be configured according to at least one of Controller Area Network (CAN) bus or Ethernet, or any other vehicle interface, which may be different from PCI Express (so that even if the PCI Express system fails, connection may still be possible to the sensor data acquisition circuit and the server circuit, for example for re-configuration or for triggering a re-start or re-boot or any other method of enumeration).

According to another aspect, a transfer of sensor data in the sensor data acquisition circuit and/or in the server circuit and/or to the server circuit is carried out based on Direct Memory Access (DMA). This may reduce computational efforts of the sensor data acquisition circuit and/or the server circuit.

In another aspect, the present disclosure is directed at a vehicle, comprising the data processing device as described above and the at least one sensor. The vehicle may further include the processing unit. The vehicle may be a (at least partially) autonomous vehicle.

In one aspect, the present disclosure is directed at a computer implemented method for configuring and operating a data processing system, the method comprising the following steps performed (in other words: carried out) by computer hardware components: reading first configuration data for a sensor data acquisition circuit from a sensor data acquisition circuit memory; configuring the sensor data acquisition circuit based on the first configuration data; reading second configuration data for a server circuit from a server circuit memory; configuring the server circuit based on the second configuration data; acquiring sensor data from at least one sensor using the sensor data acquisition circuit; receiving the sensor data in the server circuit from the sensor data acquisition circuit; and forwarding the sensor data to a processing unit.

In another aspect, the present disclosure is directed at a computer system, said computer system comprising a plurality of computer hardware components configured to carry out several or all steps of the computer implemented method described herein.

The computer system may comprise a plurality of computer hardware components (for example a processing unit, at least one memory unit and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an Internet connection. The computer readable medium may, for example, be an online data repository or a cloud storage.

The present disclosure is also directed at a computer program for instructing a computer to perform several or all steps or aspects of the computer implemented method described herein.

DRAWINGS

Exemplary embodiments and functions of the present disclosure are described herein in conjunction with the following drawings, showing schematically:

FIG. 4 schematically illustrates a standardized configuration register set.

DETAILED DESCRIPTION

The Peripheral Component Interconnect (PCI) bus may connect peripheral devices like serial interface components or graphic cards to a CPU (central processing unit), for example in a personal computer environment. The recent version of PCI is PCI Express (PCIe), which is using point to point serial hardware links instead of the originally used parallel hardware links in PCI.

PCIe may be used for different applications in the computer and mobile device industry. There may be other use cases outside a personal computer like in mobile phones for the connection of WLAN (wireless local area network) components to the main System on Chip (SoC) or to connect solid state memory devices via a cable to the mainboard of a personal computer. In data centers, PCIe may be used to connect storage device arrays via a cable to data center server devices.

Figure 1:
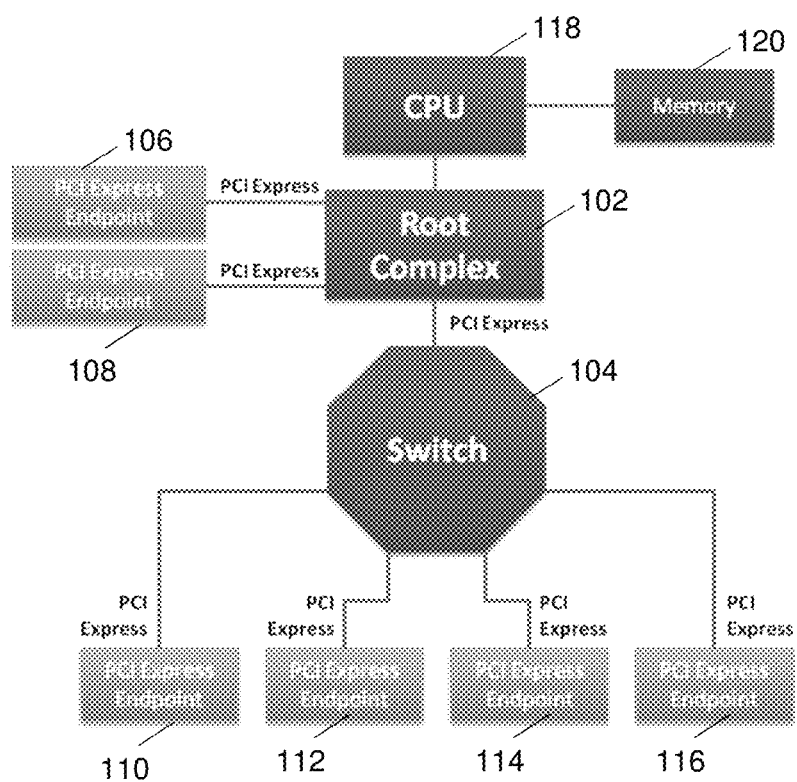
FIG. 1 is an illustration of an exemplary PCIe implementation within a computing system.

FIG. 1 shows an illustration 100 of an exemplary PCIe implementation within a computing system (for example a personal computer or a mobile device). The PCIe implementation may include several standardized main elements. For example, the Central Processing Unit (CPU) 118 and its associated memory 120 may directly connect to the PCIe Root Complex (RC) 102. The RC 102 may connect directly to peripheral components 106, 108, which may be called End Points (EP), or to a PCIe Switch 104, which connects several EP components 110, 112, 114, 116 to the RC 102. The connection between the RC 102 and the EPs 106, 108, between the RC 102 and the switch 104, and between the switch 104 and the EPs 110, 112, 114, 116 may be connections according to PCIe.

It may not be possible to connect two RC components directly to each other. A non-transparent (NT) bridging mode may be required in a PCIe switch to allow direct communication between two RC components.

PCIe uses a standardized configuration register set for each EP like shown in FIG. 4.

To address a PCIe device, the PCIe device must be enabled by being mapped into the system's I/O (input/output) port address space or memory-mapped address space. The system's firmware, device drivers or the operating system (OS) program the Base Address Registers (BARs) to inform the device of its address mapping by writing configuration commands to the PCIe controller. Because all PCIe devices are in an inactive state upon system reset, they will have no addresses assigned to them by which the operating system or device drivers can communicate with them. Either the BIOS or the OS scans on all PCIe ports for connected EPs and Switches and configures them, and this procedure may be referred to as (PCIe) enumeration.

It is also possible to connect PCIe EPs after the startup and PCIe enumeration of the system, which is called hot plugging. All EPs, which can be hot plugged, need to be known in advance by the system. The required address space for these devices needs to be reserved. They are inactive EPs, which become active after they have been physically connected to the system.

Figure 2:
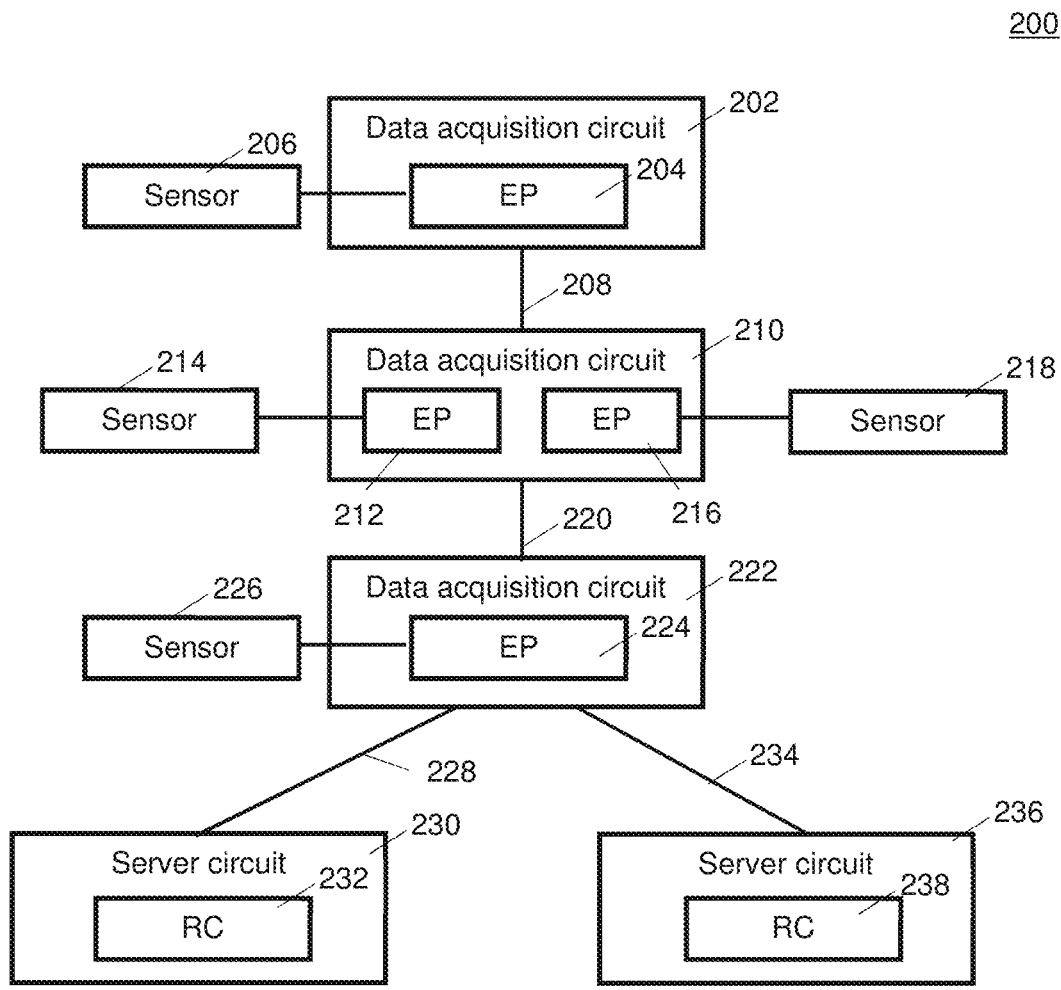
FIG. 2 is an illustration of an automotive architecture according to various embodiments.

FIG. 2 shows an illustration 200 of an automotive architecture according to various embodiments. According to various embodiments, software may be abstracted from hardware, based on a sustainable software abstraction layer, and the Inputs and Outputs (IO) may be abstracted from the associated computing devices, for example by data acquisition circuits 202, 210, 222.

According to various embodiments, PCI Express (PCIe) may be used over a cable interface to connect the data acquisition circuits 202, 210, 222 to one or two server circuits 230, 236, in order to transfer a collection of sensor data, like for instance camera data, radar data or other automotive sensor data, from the data acquisition circuits 202, 210, 222 to the server circuits 230, 236.

Each server circuit includes an RC (for example, the first server circuit 230 includes a first RC 232, and the second server circuit 236 includes a second RC 238).

Each data acquisition circuit includes one or more EPs for each sensor data link. For example, the first data acquisition circuit 202 includes one EP 204, to which one sensor 206 is connected; the second data acquisition circuit 210 includes two EPs 212, 216, wherein a first sensor 214 is connected to the first EP 212, and a second sensor 218 is connected to the second EP 216; and the third data acquisition circuit 222 includes one EP 224, to which one sensor 226 is connected.

Each sensor, connected to a data acquisition circuit, may represent a separate EP to the server circuit(s). Each data acquisition circuit may provide the needed PCIe switch function for the multiple sensor data EPs for all sensors connected to the data acquisition circuit.

As illustrated in FIG. 2, multiple data acquisition circuits 202, 210, 222 may be connected in a chain configuration to the same PCIe cable interface of a server circuit (for example via the PCIe cable interface 228 of the first server circuit 230, or via the PCIe cable interface 234 of the second server circuit 236).

Each data acquisition circuit 202, 210, 222 may contain a PCIe Switch function which connects the data acquisition circuit with its EPs to the following data acquisition circuit in front or directly to the server circuit. For example, the first data acquisition circuit 202 may be connected to the second data acquisition circuit 210 via a connection 208 (for example a PCIe connection), the second data acquisition circuit 210 may be connected to the third data acquisition circuit 222 via a connection 220 (for example a PCIe connection), and the third data acquisition circuit 222 may be connected to the first server circuit 230 via the connection 228 (for example a PCIe connection) and to the second server circuit 236 via the connection 234 (for example a PCIe connection). This stacked PCIe Switch configuration may make all sensors visible as separate EPs to the RC (in the respective server circuit) and furthermore to the CPU.

Each sensor may stream its content via its EP in the data acquisition circuit to the RC of the server circuit and finally into a separate memory buffer mapped per sensor in the server circuit.

The data transfer from the sensor data input interface at the SoC of the data acquisition circuit to the PCIe controller component of the SoC of the server circuit may use Direct Memory Access (DMA) technologies if applicable in order to transfer the sensor data with a minimum of data acquisition circuit CPU load as possible. DMA may be used also within the server circuit to transfer the received data from the PCIe controller to the server circuit memory buffer.

According to various embodiments, it may be possible to transfer the collection of sensor data simultaneously from one data acquisition circuit to two (or more) server circuits by a method of PCIe, which may be referred to as multicast. Multicast may be provided in order to feed redundant compute nodes with the same sensor data for Level 3 or higher Autonomous Driving (AD) systems. Both server circuits may receive the same data from the data acquisition circuits, and both server circuits may be building a redundant computing system.

With the redundant computing system, the AD system may still have the full sensor set available even if one compute node fails. The vehicle may perform a limp mode maneuver if one compute mode fails. The connection of two server circuits with a chain of data acquisition circuits may be provided based on the implementation of a Non-Transparent (NT) PCIe switch function in one of the server circuits in order to connect the two RCs of both server circuits to all sensor EPs in the data acquisition circuits at the same point of time.

The self-enumeration process of PCIe in a PC or a data center system may be a flexible solution and may cope with any system change very easily. But automotive systems are normally static after the production of a car. One main requirement for in-vehicle applications/systems may be a fast power up sequence. Accordingly, according to various embodiments, the PCIe system of the server circuits and the data acquisition circuits may be set up in a short time. The configuration of each RC, EP and Switch function together with all register sets and memory buffer configurations shall be able to be recalled as a known, static configuration at the startup of the system. All nodes of the system may have a configuration space in its non-persistence memory or a non-volatile memory to store and recall the normal startup PCIe configuration.

Predefined system setup versions may be stored to (or in) non-volatile memory, but in some cases at the startup of an automotive compute unit, a whole image may be downloaded from Flash (non-volatile memory) to RAM (random access memory). In this case the system setup may be loaded from RAM and not from Flash.

According to various embodiments, in case of an interface failure between the data acquisition circuits or the server circuits or a complete systems failure of a server circuit, the system may be prepared in advance with multiple known PCIe configurations which reestablish the connection to the EP(s), for example in the shortest time possible, to maintain automotive requirements and enable continued functionality, and if the vehicle is automated, it will allow a limp mode to be activated. For the automated driving situation, the possible limp mode scenario chosen may be addressed by the entire interface or system failure scenario.

For normal PCIe startup configuration in a system without failures or a system in limp mode, the PCIe configuration may be controlled by a failure detection circuit, which controls the PCIe setup in each of the PCIe node(s) of the vehicle system. An independent physical interface from the failure detection circuit to all nodes of the system (in particular to each data acquisition circuit and to each server circuit) may be provided to control the startup configuration or a limp mode configuration in the event a failure happens in the system. This interface may be CAN, Ethernet or any other vehicle interface, different from PCIe.

It will be understood that even though FIG. 2 shows two sever circuits 230, 236, the number of server circuits is not restricted to two; there may be only one server circuit, or there may be two, three, four, or any other number of server circuits.

It will be understood that even though FIG. 2 shows three data acquisition circuits 202, 210, 222, the number of data acquisition circuits is not restricted to three; there may be only one data acquisition circuit, or there may be two, three, four, or any other number of data acquisition circuits.

Likewise, the number of sensors connected to a data acquisition circuit may be one, two, three, or any other integer number. One EP may be provided in the data acquisition circuit for each sensor.

Figure 3:
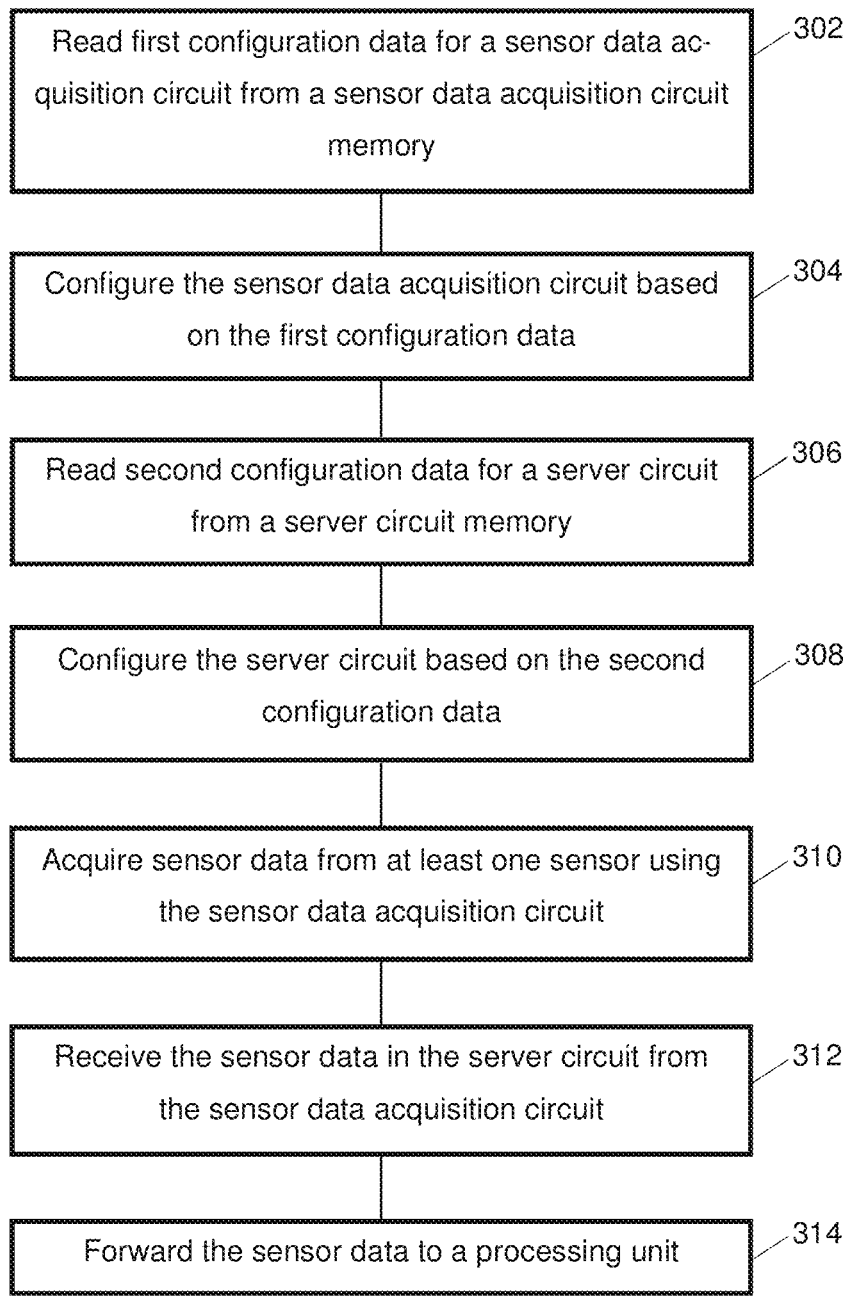
FIG. 3 is a flow diagram illustrating a method for configuring and operating a data processing system according to various embodiments.

FIG. 3 shows a flow diagram 300 illustrating a method for configuring and operating a data processing system according to various embodiments. At 302, first configuration data for a sensor data acquisition circuit may be read from a sensor data acquisition circuit memory. At 304, the sensor data acquisition circuit may be configured based on the first configuration data. At 306, second configuration data for a server circuit may be read from a server circuit memory. At 308, the server circuit may be configured based on the second configuration data. At 310, sensor data may be acquired from at least one sensor using the sensor data acquisition circuit. At 312, the sensor data may be received in the server circuit from the sensor data acquisition circuit. At 314, the sensor data may be forwarded to a processing unit.

Each of the steps 302, 304, 306, 308, 310, 312, 314, and the further steps described above may be performed by computer hardware components. It will be understood that properties and features described for the data processing system may analogously be provided for the method for configuring and operating the data processing system, and vice versa.

The invention claimed is:

1. A data processing system comprising:
   a sensor data acquisition circuit configured to acquire sensor data from at least one sensor;
   a server circuit configured to receive the sensor data from the sensor data acquisition circuit and to forward the sensor data to a processing unit;
   a first memory configured to store configuration data for the sensor data acquisition circuit;
   a second memory configured to store configuration data for the server circuit; and
   a controller comprising an interface to the sensor data acquisition circuit and to the server circuit.

2. The data processing system of claim 1, wherein the sensor data acquisition circuit comprises a PCI Express End Point, wherein the at least one sensor is connected to the PCI Express End Point.

3. The data processing system of claim 1, wherein the sensor data acquisition circuit comprises a plurality of PCI Express End Points, wherein a respective sensor is connected to each of the plurality of PCI Express End Points.

4. The data processing system of claim 1, comprising:
   a further sensor data acquisition circuit connected to the sensor data acquisition circuit;
   wherein the further sensor data acquisition circuit is configured to acquire further sensor data from at least one further sensor;
   wherein the server circuit is configured to receive the further sensor data from the further sensor data acquisition circuit via the sensor data acquisition circuit.

5. The data processing system of claim 1, wherein the server circuit comprises a PCI Express Root Complex.

6. The data processing system of claim 1, comprising a further server circuit configured to receive the sensor data from the sensor data acquisition circuit.

7. The data processing system of claim 6, wherein the server circuit and/or the further server circuit is configured according to a PCI Express Non-Transparent switch function.

8. The data processing system of claim 1, comprising a failure detection circuit configured to detect a failure in operation of the data processing system, wherein the sensor data acquisition circuit and the server circuit are configured to set a default configuration if a failure is detected.

9. The data processing system of claim 1, wherein the interface is configured according as at least one of a Controller Area Network bus interface or an Ethernet interface.

10. The data processing system of claim 1, wherein a transfer of sensor data in the sensor data acquisition circuit and/or in the server circuit and/or to the server circuit is carried out based on Direct Memory Access.

11. A vehicle, comprising:
the data processing device of claim 1; and
the at least one sensor.

12. A data processing system comprising:
a sensor data acquisition circuit configured to acquire sensor data from at least one sensor;
a server circuit configured to receive the sensor data from the sensor data acquisition circuit and to forward the sensor data to a processing unit;
a first memory configured to store configuration data for the sensor data acquisition circuit;
a second memory configured to store configuration data for the server circuit; and
a failure detection circuit configured to detect a failure in operation of the data processing system, wherein the sensor data acquisition circuit and the server circuit are configured to set a default configuration if a failure is detected.

13. A data processing system comprising:
a sensor data acquisition circuit configured to acquire sensor data from at least one sensor;
a server circuit configured to receive the sensor data from the sensor data acquisition circuit and to forward the sensor data to a processing unit;
a first memory configured to store configuration data for the sensor data acquisition circuit; and
a second memory configured to store configuration data for the server circuit,
wherein a transfer of sensor data in the sensor data acquisition circuit and/or in the server circuit and/or to the server circuit is carried out based on Direct Memory Access.

* * * * *